(No Model.)

C. E. MOORE.
RAIL BOND AND ELECTRICAL CONNECTOR.

No. 557,139. Patented Mar. 31, 1896.

Witnesses
E. T. Wray.
Lilley Johnstone

Inventor.
Charles E. Moore
by Francis W. Parker,
his Atty.

UNITED STATES PATENT OFFICE.

CHARLES E. MOORE, OF CHICAGO, ILLINOIS, ASSIGNOR TO MENARD K. BOWEN, OF SAME PLACE.

RAIL-BOND AND ELECTRICAL CONNECTOR.

SPECIFICATION forming part of Letters Patent No. 557,139, dated March 31, 1896.

Application filed October 9, 1895. Serial No. 565,124. (No model.)

*To all whom it may concern:*

Be it known that I, CHARLES E. MOORE, a citizen of the United States, residing at Chicago, in the county of Cook and State of Illinois, have invented a certain new and useful Improvement in Rail-Bonds and Electrical Connectors, of which the following is a specification.

My invention relates to rail-bonds and electrical conductors for the successive rail in a street or other such railway system.

My invention is illustrated in the accompanying drawings, wherein—

Figure 1:
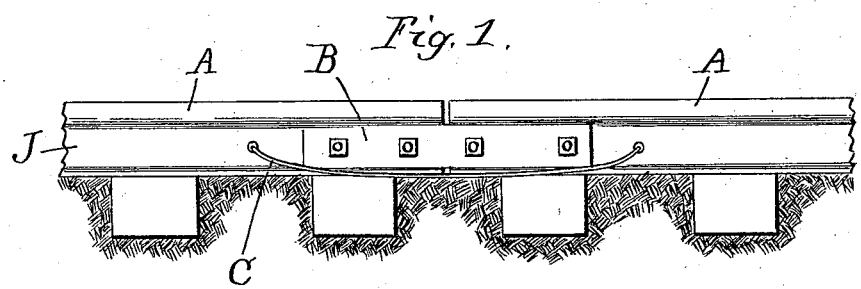
Figure 2:
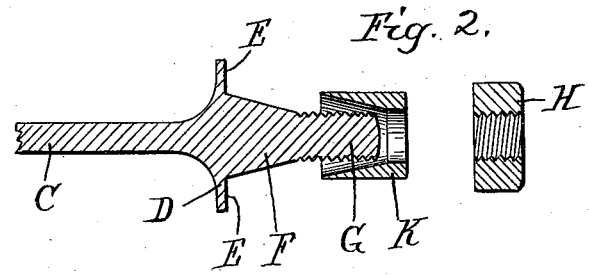
Figure 3:
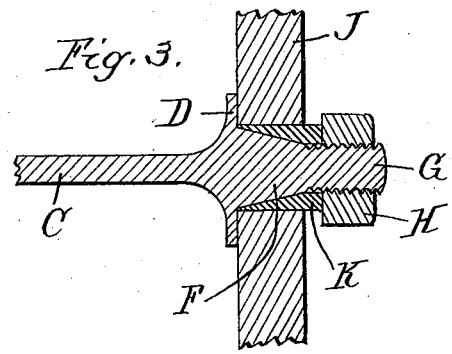

Figure 1 is a view of two adjacent rails with my connector applied thereto. Fig. 2 is a detail section of the end of the connector, the sleeve and the nut arranged in relative position. Fig. 3 is a similar view with the parts brought into position within the aperture in the rail.

Like parts are indicated by the same letter in all the figures.

A A are the ends of adjacent rails; B, the fish-plate connecting them; C, the body of the bond or connector. At each end of this connector is a raised annular flange D, preferably having a flat surface E toward the rail. Beyond this flange and flat surface projects a conically-shaped portion F, which terminates in the screw-threaded portion G, adapted to receive the nut H. The web of the rail J is perforated to receive the sleeve K, which is conically recessed inside and adapted to receive the part F of the rail-bond.

It is evident, of course, that these several parts may be varied greatly without departing from the spirit of my invention, and to express myself more fully on this point I wish it understood that for the screw and nut I have only shown one of the methods which I may employ to draw the parts into position. With reference to this one feature of my invention, I consider that any means whereby the head of the bond and the sleeve will be forced toward each other and thus firmly seated in the aperture of the rail by drawing the bond in one direction and shoving the sleeve in the other comes within the spirit of my invention and is the substantial equivalent of what I have shown.

The use and operation of my invention are as follows:

In devices of this kind it has been common to drive the parts together; but this involves hammering, and each blow, while it may tend to tighten, at the same time also tends to loosen, the parts, and hence there are not many constructions in which the total effect of driving is to satisfactorily seat the parts. Moreover, with reference to rail-bonds and connectors, their use is such as to make it desirable to prevent the several parts from being easily separated and lost, and hence there is an advantage in the use of the nut as I have designed it, which holds the sleeve in secure position, so that each bond when delivered is complete, consisting of the bond itself, the two sleeves and the two nuts, all of which parts remain safely together and in their proper relation until they are ready to be used. When they are to be used, a hole is punched or bored or drilled in the web of the rail at the proper point of a diameter such as to admit the sleeve. The bond is now inserted, the screw-threaded and conical portion projecting through the hole, and the flat surface of the flange being brought up the side of the web. This leaves the sleeve within the aperture. The nut is now applied and it is forced firmly into position, thus drawing the bond in one direction while forcing the sleeve in the other, so that the two parts are powerfully drawn toward each other and expanded within the hole, so as to make a very secure and perfect contact all about.

The relative proportions and the sizes of the several parts can of course be varied at will according to the conditions under which they are to be used and the character of the substance of which they are composed.

The head or the sleeve and head may be made of such size as to furnish the right contact with the metal of the web, thus insuring the proper conductivity.

I claim—

1. A rail-bond consisting of a conductor provided with a flange at each end and a reduced portion projecting beyond the flange, and a sleeve to surround the reduced portion, and means associated with sleeve and conductor so that the two parts are forced toward each other and thus expanded within the aperture of the rail.

2. A rail-bond consisting of a conductor with a flange having a flat surface toward the rail, a reduced portion projecting from such flat portion, a screw-thread on the outer end of such reduced portion, a sleeve to encircle such reduced portion, the sleeve and reduced portion adapted to be received in the aperture of the rail and the nut adapted then to force them together and expand them within the rail.

3. A rail-bond consisting of a conductor provided with a flange at each end and a reduced portion projecting beyond the flange, and a sleeve to surround the reduced portion, and means associated with sleeve and conductor so that the two parts are forced toward each other and thus expanded within the aperture of the rail, the opposed surfaces of the reduced portion and the sleeve being inclined.

4. A rail-bond consisting of a conductor with a flange having a flat surface toward the rail, a reduced portion projecting from such flat portion, a screw-thread on the outer end of such reduced portion, and a sleeve to encircle such reduced portion, the sleeve and reduced portion adapted to be received in the aperture of the rail and the nut adapted then to force them together and expand them within the rail, the opposed surfaces of the reduced portion and the sleeve being inclined.

Chicago, September 30, 1895.

CHARLES E. MOORE.

Witnesses:
FRANCIS W. PARKER,
LILLEY JOHNSTONE.